United States Patent [19]

Schmidt

[11] 4,369,920

[45] Jan. 25, 1983

[54] ARRANGEMENT TO COOL THE THRUST NOZZLE FOR A ROCKET ENGINE

[75] Inventor: Günther Schmidt, Taufkirchen, Fed. Rep. of Germany

[73] Assignee: Messerschmitt-Bölkow-Blohm GmbH, Fed. Rep. of Germany

[21] Appl. No.: 210,843

[22] Filed: Nov. 26, 1980

[30] Foreign Application Priority Data

Dec. 8, 1979 [DE] Fed. Rep. of Germany ........ 2949522

[51] Int. Cl.$^3$ .............................................. F02K 11/00
[52] U.S. Cl. .................................... 239/127.3; 60/265; 60/267
[58] Field of Search .......................... 60/260, 265–267; 239/12, 127.1, 127.3

[56] References Cited

U.S. PATENT DOCUMENTS

| 3,091,924 | 6/1963 | Wilder, Jr. | 239/265.17 X |
| 3,267,664 | 8/1966 | Jones et al. | 60/267 X |
| 3,605,412 | 9/1971 | Stockel | 239/127.3 X |
| 4,055,044 | 10/1977 | Dederra et al. | 239/127.3 |

OTHER PUBLICATIONS

*Rocket Propulsion*, Barrere et al., Elsevier Pub. Co., 1960, p. 462.

Primary Examiner—Andres Kashnikow
Attorney, Agent, or Firm—McGlew and Tuttle

[57] ABSTRACT

A rocket engine includes a housing which defines a combustion chamber and a thrust nozzle connected to the combustion chamber and having an opposite end terminating in a thrust discharge. The thrust nozzle includes a rear section which includes walls or channels defined for transmitting a fluid in heat exchange relationship with the walls of the rear section advantageously as a regenerative cooling. The thrust nozzle also includes a rear section which terminates in a discharge opening or series of discharge openings at the rear end thereof which aids in the thrust generation. The rear thrust nozzle section is provided with one or more inlet openings and with a plurality of discharges or outlets which open into the interior of the thrust nozzle section and provide a film cooling along the interior wall thereof at spaced axial or longitudinal locations along the thrust nozzle. The individual outlets may be supplied with cooling fluid from the cooling channels of the thrust nozzle rear section which may be fed from one single inlet ring or a series of inlets or rings which are spaced along the length of the rear section.

8 Claims, 2 Drawing Figures

ARRANGEMENT TO COOL THE THRUST NOZZLE FOR A ROCKET ENGINE

FIELD AND BACKGROUND OF THE INVENTION

The invention relates in general to thrust engines and in particular to a new and useful arrangement to cool the thrust nozzle for a rocket engine whose rear portion is cooled by at least one liquid medium, in particular a liquid fuel or propellant such as hydrogen which evaporates within the wall of the rear thrust nozzle section and discharges into the open under thrust generation (rear open cooling circuit).

According to German Pat. No. DE-PS 23 56 572, a rocket combustion chamber with thrust nozzle is known, which has two mutually independent cooling circuits, a regenerative front one which is coordinated with the front section of the thrust nozzle as well as to the combustion chamber and leads to the injection head, and a rear one which flows in the rear thrust nozzle section and is open at the end of the thrust nozzle, its flow volume being very small compared to the regenerative cooling circuit and the evaporating volume inside the rear thrust nozzle wall, discharging into the open under thrust generation.

It is further known in rocket combustion chambers with thrust nozzles to protect the nozzle neck and the rear section of the thrust nozzle by film cooling in contact with the inside of the nozzle wall, in addition to regenerative wall cooling, (see U.S. Pat. No. 3,605,412).

It is apparent from a comparison of the two above described cooling possibilities that both pure dump cooling and film or mist cooling have their advantages and disadvantages. For instance, dump cooling brings with it heavy nozzle designs because the nozzle must be dual-walled with mutual supports of inner and outer walls, or must consist of individual, juxtaposed tubes. Furthermore, the rear thrust nozzle components intended for dump cooling are very expensive due to their complicated design because, as already mentioned, they are often composed of individual tubes which are costly per se, with much manual labor required to join them firmly. Even though the cooling efficiency of dump cooling is high due to evaporation which consumes large amounts of heat, an "impulse" loss is associated with this cooling mode because the dump quantity does not participate in the reaction process with its high specific impulse generation.

The advantage of film cooling lies in light-weight nozzle design, but this cooling mode requires a great deal of medium or fuel because the mixing rate between the film mist and the radially adjacent, extremely hot thrust nozzle flow is very high so that coolant is lost continuously. Yet, there is not always assurance that the comingling coolant will participate in the reaction because the radial outside zone of the thrust nozzle flow is enriched by the coolant component. This reaction loss, in turn, leads to an overall process power loss. If an inert coolant is used, it is entirely at the expense of the specific impulse.

Thus, besides certain advantages, the above described cooling modes also have disadvantages which must not be overlooked and which, in dump cooling, have an additional effect and entail a functional limitation because it is no longer possible to increase the flow velocity inside the cooling channels due to the occurring high pressure losses and the attainment of the speed of sound.

SUMMARY OF THE INVENTION

The invention provides a cooling system which, while retaining the advantages of the known cooling modes, avoids their disadvantages, i.e. whose impulse losses are lower at optimum cooling efficiency, relatively low production cost and structural gain.

According to the invention, an arrangement to cool the thrust nozzle includes a thrust engine with a rear thrust nozzle section which is protected additionally by film cooling in contact with the inside of the inner thrust nozzle wall.

In further development of the invention there are provided on the inside of the wall of the rear thrust nozzle section a plurality of rows, mutually spaced one behind the other, of coolant outlet openings which are connected to the rear open cooling circuit.

Within the scope of the invention is utilized, besides a basic cooling system in the form of dump cooling, a film cooling system supplied by the former, affording, due to the multiple inlet openings located one behind the other in axial direction, an increased cooling effect through the staggered supply of fresh coolant because the mixing distances for the individual amounts of coolant fed in are shortened.

If, according to another feature of the invention, inlet rings to feed coolant to the rear open cooling circuit are disposed on the outside of the wall of the rear thrust section in the area of the various rows of the film cooling outlet openings, then not only the open dump cooling circuit, but also the open film cooling circuit is freshened in stages, whereby the flow conditions are improved in the dump cooling circuit and the film cooling circuit and the effect is regenerated and extraordinarily intensified.

This phenomonon is enhanced even more when, according to the invention, these inlet rings further are located shortly behind the individual rows of outlet openings, as viewed in flow direction. For, by such an inlet arrangement, the amount discharging from the dump cooling circuit to the inside for the film cooling system is replaced by a fresh coolant amount from the outside so that a flow continuity with little loss is achieved for the dump cooling circuit.

Accordingly, it is an object of the invention to provide a thrust generator or rocket engine which comprises a housing which has a combustion chamber portion connected at its rear end to a thrust nozzle having a narrow neck portion and a divergent wall portion forming a first thrust nozzle section which is joined at its rear end to a second thrust nozzle section of a divergent wall portion extending outwardly to the rear and terminating in a discharge. The front nozzle section is cooled by circulating cooling medium such as a propellant component through channels or ducts formed in the walls of the associated section and in addition, the rear thrust nozzle section is cooled by similar cooling medium circulated into the walls or ducts of the rear nozzle section and discharged through outlets which extend into the interior of the thrust nozzle section and provide film cooling along the length of the rear section. The outlets are advantageously located at spaced axial or longitudinal locations along the rear section so that there is a constant regeneration of the film cooling. Each regenetive outlet opening is associated with either a single inlet cooling medium supply or a plurality of separate longitudinally spaced cooling medium inlet supplies.

An object of the invention is to provide an improved rear thrust nozzle section cooling for thrust generators in which there are a plurality of axially spaced discharge outlets for cooling medium to provide for separate cooling films along the interior of the thrust nozzle at longitudinally spaced locations.

A further object of the invention is to provide a rocket engine thrust or thrust generator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
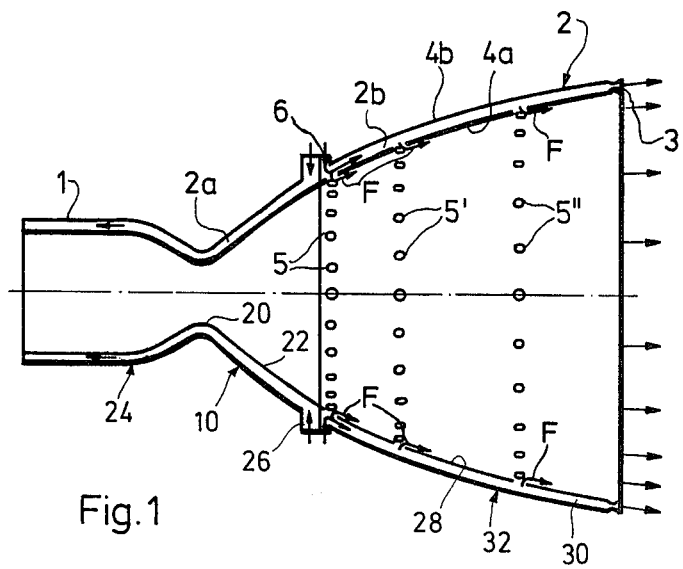
FIG. 1 is a schematic partial sectional view of a rocket engine constructed in accordance with the invention.

Referring to the drawings in particular the invention embodied therein comprises a rocket engine or thrust generator generally designated 10 which includes a housing having a combustion chamber portion 1 connected at its rear end to a thrust nozzle portion generally designated 2. Thrust nozzle portion 2 has a front section 2a which includes a narrow neck portion 20 and a front divergent wall portion 22 having a regenerative cooling system generally designated 24 associated therewith which as shown has an inlet 26 for circulating a cooling medium such as a propellant component through channels of the thrust generator which are formed along the length of the combustion chamber and the front nozzle section 2a.

The thrust generator in accordance with the invention also includes the thrust nozzle rear section 2b which comprises a divergent wall portion 28 having one or more cooling channels 30 associated therewith which are cooled by a separate cooling circuit generally designated 32 which is fed from a single ring inlet member 6. The flow is into the ring member 6 and along the channels 30 and through outlets 5, 5' and 5" which are arranged at spaced circumferential locations around the periphery of the interior of the thrust nozzle section and in rows which are spaced longitudinally or axially along the section. The outlets or openings 5, 5' and 5" are fed from the single inlet 6 in the embodiment of FIG. 1 but the flow is maintained to supply a continuous flow of coolant along the entire length of the inside of inner wall 4a of the rear thrust nozzle section 2b.

As may be seen from FIG. 1, a thrust engine generally designated 1 includes a combustion chamber 1 and a front section 2a of a thrust nozzle 2 which are cooled regeneratively. The medium used here for cooling, a propellant compound namely liquid hydrogen in particular, is directed into an injection head (not shown) and is injected into the combustion chamber 1. A smaller part amount of the liquid hydrogen forms a rear, open cooling circuit, a so called pump cooling circuit, within the wall of a rear thrust nozzle section 2b. The coolant absorbs heat and evaporates within the wall of the thrust nozzle section 2b and discharges into the open under thrust generation at the rear end through nozzle portions where a tube design is used, or through a ring nozzle 3 when a dual-wall design is used as shown.

Provided on the inner wall 4a of the rear thrust nozzle section 2b are several rows, disposed one behind the other in flow direction, of outlet openings 5 through which a part of the coolant flowing inside the wall of the rear thrust nozzle section 2b discharges, forming a cooling mist along the inner wall 4a. In this process, as much coolant is branched off for the film cooling system F that the flow velocities of the amount of coolant remaining within the wall of the rear thrust nozzle section 2b (dump cooling) do not become too great and harmful. The flow is such that adequate film cooling is assured from row to row of the openings 5. This also guarantees complete mixing of the stepped film coolant supply with the gas flow (thrust flow). Thus, maximum cooling power and optimum economy of the overall process are achieved with the least elaborate technical cooling means. The coolant for the rear open cooling circuit is supplied via a single inlet ring 6 only in the embodiment according to FIG. 1.

Figure 2:
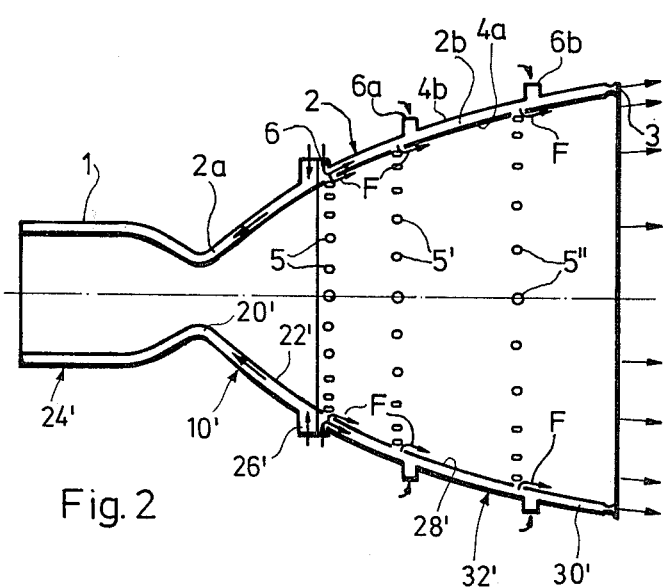
FIG. 2 is a view similar to FIG. 1 of another embodiment of the invention.

The embodiment of FIG. 2 is similar to FIG. 1 and similar parts are similarly designated but with primes. The principle feature of the embodiment of FIG. 2 is that more than a single inlet is provided for the rear thrust nozzle cooling section 32'.

According to FIG. 2, several inlet rings 6, 6a, 6b . . . , located one behind the other in flow direction, are provided on the outside wall 4b of the rear thrust nozzle section 2b—each being located shortly behind the respective rows of outlet openings 5. Due to the stepped supply of fresh coolant to each, heating and, hence, the flow velocity of the open dump cooling circuit are kept within favorable limits and the film cooling F is optimized with respect to sectioning and feeding fresh coolant amounts.

Due to its low molecular weight, the use of liquid hydrogen as coolant has a particularly favorable effect.

While specific embodiments of the invention have been shown and described in detail to illustrate the application of the principles of the invention, it will be understood that the invention may be embodied otherwise without departing from such principles.

What is claimed is:

1. A rocket engine, comprising a housing having a combustion chamber portion, a thrust nozzle having one end connected to said combustion chamber portion and having a front nozzle section adjacent said combustion chamber with a narrow throat portion and a front divergent wall part diverging outwardly from said narrow throat portion and including a rear nozzle section with a rear divergent wall part connected to the rear end of said front divergent wall part and terminating at its rear end in a thrust discharge, cooling fluid channel flow means associated with said combustion chamber in said front nozzle section for supplying a coolant thereto for the cooling thereof, said rear nozzle section including walls defining a coolant channel extending along the length of said rear nozzle section, at least one inlet connected into said cooling channel for supplying a coolant to said cooling channel and a plurality of outlets connecting from said cooling channel to the interior of said rear thrust nozzle section including longitudinally spaced outlets arranged along the length of said rear thrust nozzle section and providing a fluid film flow to the interior wall of said rear thrust nozzle section.

2. A rocket engine according to claim 1, wherein there are a plurality of rows of nozzle outlets extending from said cooling channel to the interior wall of said rear nozzle section, said rows being spaced axially along the length of said rear nozzle section.

3. A rocket engine according to claim 1, wherein said cooling channel includes a rear nozzle discharge at its rear end.

4. A rocket engine according to claim 1, wherein said cooling channel has a plurality of coolant outlet openings extending therefrom into the interior of said rear thrust nozzle section spaced one behind the other along the length thereof.

5. A rocket engine according to claim 1, wherein said cooling channel is connected at several locations along its length thereto to a separate ring inlet for supplying a coolant thereto.

6. A rocket engine according to claim 5, wherein said inlet rings are located directly downstream of the individual rows of outlet openings.

7. A thrust nozzle for a rocket engine, comprising a front nozzle section with a narrow throat portion and a front divergent wall part diverging outwardly from said narrow throat portion and including a rear nozzle section with a rear divergent wall part connected to the rear end of said front divergent wall part and terminating at its rear end in a thrust discharge, means defining two mutually independent cooling circuits for said thrust nozzle including a regenerative front cooling circuit connected to the walls of said front nozzle section and an open rear cooling circuit cooled by a liquid propellant particularly hydrogen, means for directing the liquid propellant through the open cooling circuit, said open cooling circuit having openings into the interior of the nozzle wall and opening to ambience at its extreme end adjacent the edge of said thrust nozzle and producing a thrust, said open rear cooling circuit having a plurality of openings into the interior of said nozzle wall and connected to direct a cooling film adhering to the inside of the thrust nozzle wall and a plurality of successive rows spaced axially along the length thereof and an inlet ring adjacent each of the rows on the exterior of said thrust nozzle wall connected to said open channel for supplying a liquid propellant to said channel.

8. A thrust nozzle according to claim 7, wherein said inlet rings are provided close downstream of each of the rows of openings to the interior of said walls.

* * * * *